US012645241B2

(12) United States Patent
Chen

(10) Patent No.: US 12,645,241 B2
(45) Date of Patent: Jun. 2, 2026

(54) LOW-DROPOUT REGULATOR HAVING OUTPUT VOLTAGE SWITCHING CIRCUIT

(71) Applicant: ANPEC ELECTRONICS CORPORATION, Hsinchu (TW)

(72) Inventor: Chih-Ning Chen, Taipei City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 252 days.

(21) Appl. No.: 18/604,438

(22) Filed: Mar. 13, 2024

(65) Prior Publication Data
US 2025/0172960 A1 May 29, 2025

(30) Foreign Application Priority Data
Nov. 24, 2023 (TW) ................................. 112145497

(51) Int. Cl.
*G05F 1/575* (2006.01)
*G05F 1/565* (2006.01)
*H02M 1/00* (2006.01)

(52) U.S. Cl.
CPC .............. *G05F 1/575* (2013.01); *G05F 1/565* (2013.01); *H02M 1/0025* (2021.05); *H02M 1/0045* (2021.05)

(58) Field of Classification Search
CPC ...... G05F 1/575; G05F 1/565; H02M 1/0025; H02M 1/0045
See application file for complete search history.

(56) References Cited

U.S. PATENT DOCUMENTS

| | | | | |
|---|---|---|---|---|
| 2008/0116862 A1* | 5/2008 | Yang | ....................... | G05F 1/575 323/269 |
| 2014/0084881 A1* | 3/2014 | Shih | .......................... | G05F 1/56 323/269 |
| 2018/0284823 A1* | 10/2018 | Na | .......................... | G05F 1/575 |
| 2018/0292851 A1* | 10/2018 | Mahajan | ............. | H02M 1/0045 |

* cited by examiner

*Primary Examiner* — Lakaisha Jackson
(74) *Attorney, Agent, or Firm* — Li & Cai Intellectual Property Office

(57) ABSTRACT

A low-dropout regulator having an output voltage switching circuit is provided. In the low-dropout regulator, a low-dropout linear regulator circuit outputs a regulating signal according to a voltage difference between a second terminal of a transistor and a regulating threshold voltage signal or a reference voltage. In the low-dropout regulator, a switch error amplifier circuit outputs a pull-up control signal according to a voltage difference between the second terminal of the transistor and a voltage pull-up switching signal. When a voltage selector circuit of the low-dropout regulator selects the regulating signal, the transistor operates to regulate an output voltage of the low-dropout regulator according to the regulating signal. When the voltage selector circuit selects the pull-up control signal, a switch component is turned on by the pull-up control signal such that the output voltage of the low-dropout regulator is directly pulled up by an input voltage.

19 Claims, 6 Drawing Sheets

VIN

VREF

VOUT
(SSLDO)

SSSW

LOW-DROPOUT REGULATOR HAVING OUTPUT VOLTAGE SWITCHING CIRCUIT

CROSS-REFERENCE TO RELATED PATENT APPLICATION

This application claims the benefit of priority to Taiwan Patent Application No. 112145497, filed on Nov. 24, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a low-dropout regulator, and more particularly to a low-dropout regulator having an output voltage switching circuit.

BACKGROUND OF THE DISCLOSURE

Low-dropout regulators (LDOs) are widely used as power management components for supplying low-noise, high-precision stable voltages to noise-sensitive circuit components. However, output voltages of conventional low-dropout regulators are unable to be quickly pulled up. As a result, the conventional low-dropout regulators cannot supply enough power required for a load. Accordingly, there is a need for the conventional low-dropout regulators to be further improved.

SUMMARY OF THE DISCLOSURE

In response to the above-referenced technical inadequacies, the present disclosure provides a low-dropout regulator having an output voltage switching circuit. The low-dropout regulator includes a transistor, a low-dropout linear regulator circuit, a switch error amplifier circuit, a switch component and a voltage selector circuit. A first terminal of the transistor is coupled with an input voltage. A second terminal of the transistor is grounded. The second terminal of the transistor is used as an output terminal of the low-dropout regulator. The low-dropout linear regulator circuit is connected to the output terminal of the low-dropout regulator. The low-dropout linear regulator circuit is configured to output a regulating signal according to a voltage difference between an output voltage of the low-dropout regulator and a voltage of a regulation threshold voltage signal or a reference voltage. The switch error amplifier circuit is connected to the output terminal of the low-dropout regulator. The switch error amplifier circuit is configured to output a pull-up control signal according to a voltage difference between the output voltage of the low-dropout regulator and a voltage of a voltage pull-up switching signal. A first terminal of the switch component is coupled with the input voltage. A second terminal of the switch component is connected to the output terminal of the low-dropout regulator. A control terminal of the switch component is connected to the switch error amplifier circuit. The switch component is configured to operate according to the pull-up control signal from the switch error amplifier circuit. The voltage selector circuit is connected to the low-dropout linear regulator circuit, the switch error amplifier circuit and a control terminal of the transistor. The voltage selector circuit is configured to select one of the regulating signal and the pull-up control signal. When the voltage selector circuit selects the regulating signal from among the regulating signal and the pull-up control signal, the voltage selector circuit transmits the regulating signal to the control terminal of the transistor, and the transistor operates to regulate the output voltage of the low-dropout regulator according to the regulating signal from the voltage selector circuit. When the voltage selector circuit selects the pull-up control signal from among the regulating signal and the pull-up control signal, the switch component is turned on by the pull-up control signal from the switch error amplifier circuit such that the output voltage of the low-dropout regulator is directly pulled up by the input voltage through the switch component.

In one of the possible or preferred embodiments, the low-dropout regulator further includes an output capacitor. A first terminal of the output capacitor is connected to the second terminal of the transistor. A second terminal of the output capacitor is grounded. A voltage of the first terminal of the output capacitor is used as the output voltage of the low-dropout regulator.

In one of the possible or preferred embodiments, the voltage selector circuit compares a voltage of the regulating signal from the low-dropout linear regulator circuit with a voltage of the pull-up control signal from the switch error amplifier circuit to select one of the regulating signal and the pull-up control signal.

In one of the possible or preferred embodiments, the low-dropout linear regulator circuit includes a first error amplifier. A first input terminal of the first error amplifier is coupled with the reference voltage. A second input terminal of the first error amplifier is connected to an external regulation instructing circuit, and configured to receive the regulation threshold voltage signal from the regulation instructing circuit. A third input terminal of the first error amplifier is connected to the output terminal of the low-dropout regulator. An output terminal of the first error amplifier is connected to an input terminal of the voltage selector circuit.

In one of the possible or preferred embodiments, the switch error amplifier circuit includes a second error amplifier. A first input terminal of the second error amplifier is connected to the output terminal of the low-dropout regulator. A second input terminal of the second error amplifier is connected to an external pull-up enable circuit, and configured to receive the voltage pull-up switching signal from the external pull-up enable circuit. An output terminal of the second error amplifier is connected to the control terminal of the switch component.

In one of the possible or preferred embodiments, the voltage selector circuit includes a multiplexer. A first input terminal of the multiplexer is connected to the output terminal of the first error amplifier. A second input terminal of the multiplexer is connected to the output terminal of the second error amplifier. An output terminal of the multiplexer is connected to the control terminal of the transistor.

In one of the possible or preferred embodiments, the low-dropout regulator further includes a voltage divider circuit. An input terminal of the voltage divider circuit is connected between the second terminal of the transistor and a ground. An output terminal of the voltage divider circuit is connected to the third input terminal of the first error amplifier and the first input terminal of the second error amplifier.

In one of the possible or preferred embodiments, the voltage divider circuit includes a first resistor and a second resistor. A first terminal of the first resistor is connected to the second terminal of the transistor. A first terminal of the second resistor is connected to a second terminal of the first resistor. A second terminal of the second resistor is grounded. The third input terminal of the first error amplifier and the first input terminal of the second error amplifier are connected to a node between the first terminal of the second resistor and the second terminal of the second resistor.

In one of the possible or preferred embodiments, the low-dropout regulator further includes a switching component. A control terminal of the switching component is connected to the output terminal of the second error amplifier. A first terminal of the switching component is connected to the input terminal of the voltage selector circuit and the control terminal of the switch component. A second terminal of the switching component is grounded.

In one of the possible or preferred embodiments, the low-dropout regulator further includes a charge pump. The charge pump is connected to the control terminal of the switch component and the first terminal of the switching component. The charge pump is configured to supply power to the control terminal of the switch component.

In order to solve the above-mentioned problems, one of the technical aspects adopted by the present disclosure is to provide a low-dropout regulator having an output voltage switching circuit. The low-dropout regulator includes a voltage selector circuit, a transistor, a low-dropout linear regulator circuit, a switch error amplifier and a switch component. The voltage selector circuit is coupled with a reference voltage and connected to an external pull-up enable circuit. The voltage selector circuit is configured to receive a voltage pull-up switching signal from the external pull-up enable circuit. The voltage selector circuit is configured to select one of the reference voltage and the voltage pull-up switching signal to output a voltage selected signal. A first terminal of the transistor is coupled with an input voltage. A second terminal of the transistor is grounded, and the second terminal of the transistor is used as an output terminal of the low-dropout regulator. The low-dropout linear regulator circuit is connected to the output terminal of the low-dropout regulator, a control terminal of the transistor and an output terminal of the voltage selector circuit. The low-dropout linear regulator circuit is configured to output a regulating signal to the control terminal of the transistor according to a voltage difference between an output voltage of the low-dropout regulator and a voltage of the voltage selected signal or a voltage of a regulation threshold voltage signal. The switch error amplifier circuit is connected to the output terminal of the low-dropout regulator and the external pull-up enable circuit. The switch error amplifier circuit is configured to output a pull-up control signal according to a voltage difference between the output voltage of the low-dropout regulator and a voltage of the voltage pull-up switching signal from the external pull-up enable circuit. A first terminal of the switch component is coupled with the input voltage. A second terminal of the switch component is connected to the output terminal of the low-dropout regulator. A control terminal of the switch component is connected to the switch error amplifier circuit. The switch component is configured to operate according to the pull-up control signal from the switch error amplifier circuit.

In one of the possible or preferred embodiments, the low-dropout regulator further includes an output capacitor. A first terminal of the output capacitor is connected to the second terminal of the transistor A second terminal of the output capacitor is grounded. A voltage of the first terminal of the output capacitor is used as the output voltage of the low-dropout regulator.

In one of the possible or preferred embodiments, the low-dropout linear regulator circuit includes a first error amplifier. A first input terminal of the first error amplifier is connected to the output terminal of the voltage selector circuit. A second input terminal of the first error amplifier is connected to an external regulation instructing circuit, and configured to receive the regulation threshold voltage signal from the regulation instructing circuit. A third input terminal of the first error amplifier is connected to the output terminal of the low-dropout regulator. An output terminal of the first error amplifier is connected to the control terminal of the transistor.

In one of the possible or preferred embodiments, the switch error amplifier circuit includes a second error amplifier. A first input terminal of the second error amplifier is connected to the output terminal of the low-dropout regulator. A second input terminal of the second error amplifier is connected to the external pull-up enable circuit, and configured to receive the voltage pull-up switching signal from the external pull-up enable circuit. An output terminal of the second error amplifier is connected to the control terminal of the switch component.

In one of the possible or preferred embodiments, the voltage selector circuit includes a multiplexer. A first input terminal of the multiplexer is coupled with the reference voltage. A second input terminal of the multiplexer is connected to the external pull-up enable circuit and configured to receive the voltage pull-up switching signal from the external pull-up enable circuit. An output terminal of the multiplexer is connected to the first input terminal of the first error amplifier.

In one of the possible or preferred embodiments, the low-dropout regulator further includes a voltage divider circuit. An input terminal of the voltage divider circuit is connected between the second terminal of the transistor and a ground. An output terminal of the voltage divider circuit is connected to the third input terminal of the first error amplifier and the first input terminal of the second error amplifier.

In one of the possible or preferred embodiments, the voltage divider circuit includes a first resistor and a second resistor. A first terminal of the first resistor is connected to the second terminal of the transistor. A first terminal of the second resistor is connected to a second terminal of the first resistor, and a second terminal of the second resistor is grounded. The third input terminal of the first error amplifier and the first input terminal of the second error amplifier are connected to a node between the first terminal of the second resistor and the second terminal of the second resistor.

In one of the possible or preferred embodiments, the low-dropout regulator further includes a switching component. A control terminal of the switching component is connected to the output terminal of the second error amplifier. A first terminal of the switching component is connected to the control terminal of the switch component. A second terminal of the switching component is grounded.

In one of the possible or preferred embodiments, the low-dropout regulator further includes a charge pump. The charge pump is connected to the control terminal of the switch component and the first terminal of the switching component. The charge pump is configured to supply power to the control terminal of the switch component.

As described above, the present disclosure provides the low-dropout regulator having the output voltage switching circuit. In the low-dropout regulator of the present disclosure, the low-dropout linear regulator circuit is configured to control the transistor, and the switch error amplifier circuit is configured to turn on or off the switch component. The low-dropout linear regulator circuit and the switch error amplifier circuit of the low-dropout regulator of the present disclosure are alternately used, and may be quickly switched for responding to adjustments in practical application, for example, quickly pulling up the output voltage of the low-dropout regulator of the present disclosure to a target voltage required for the load. Therefore, the low-dropout regulator of the present disclosure is capable of quickly supplying enough power required for the load.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
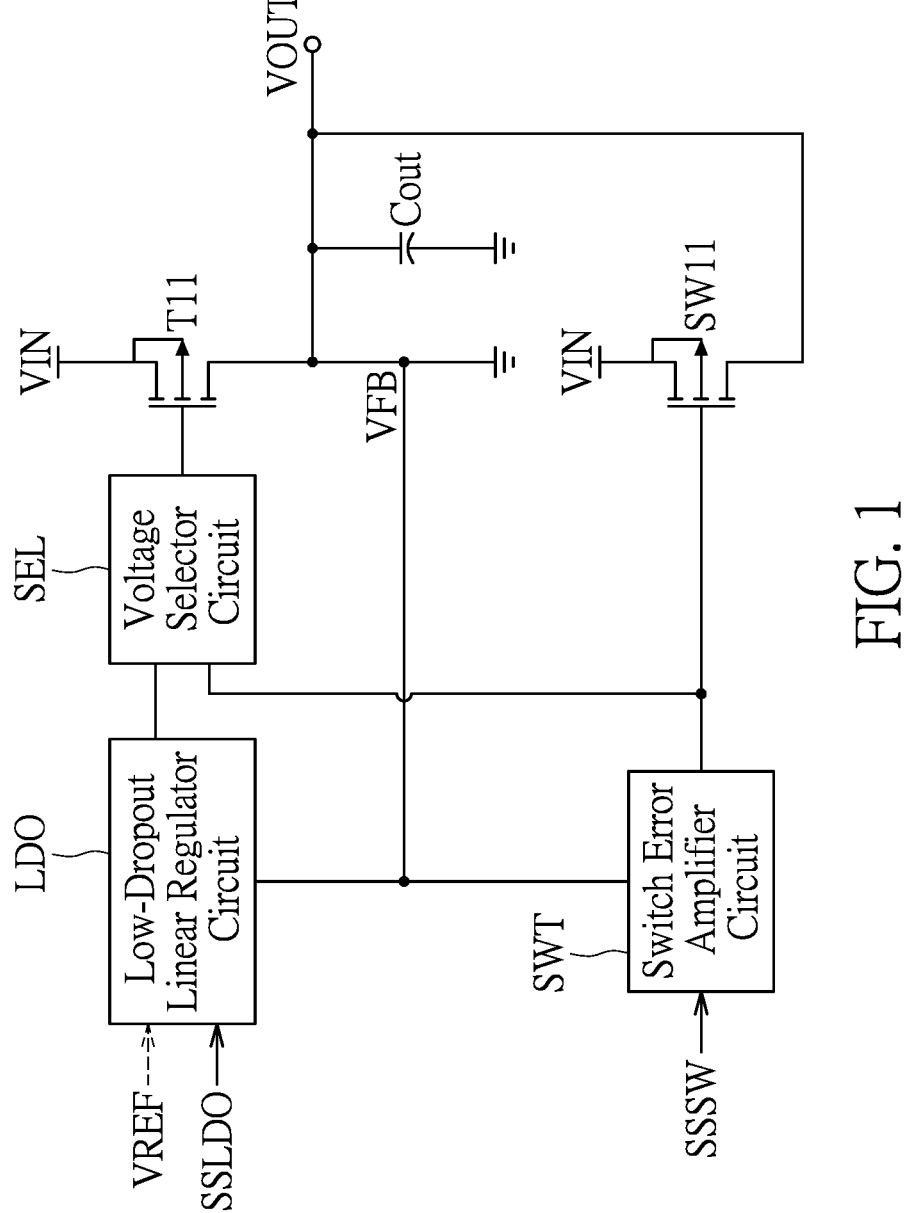
FIG. 1 is a circuit diagram of a low-dropout regulator having an output voltage switching circuit according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
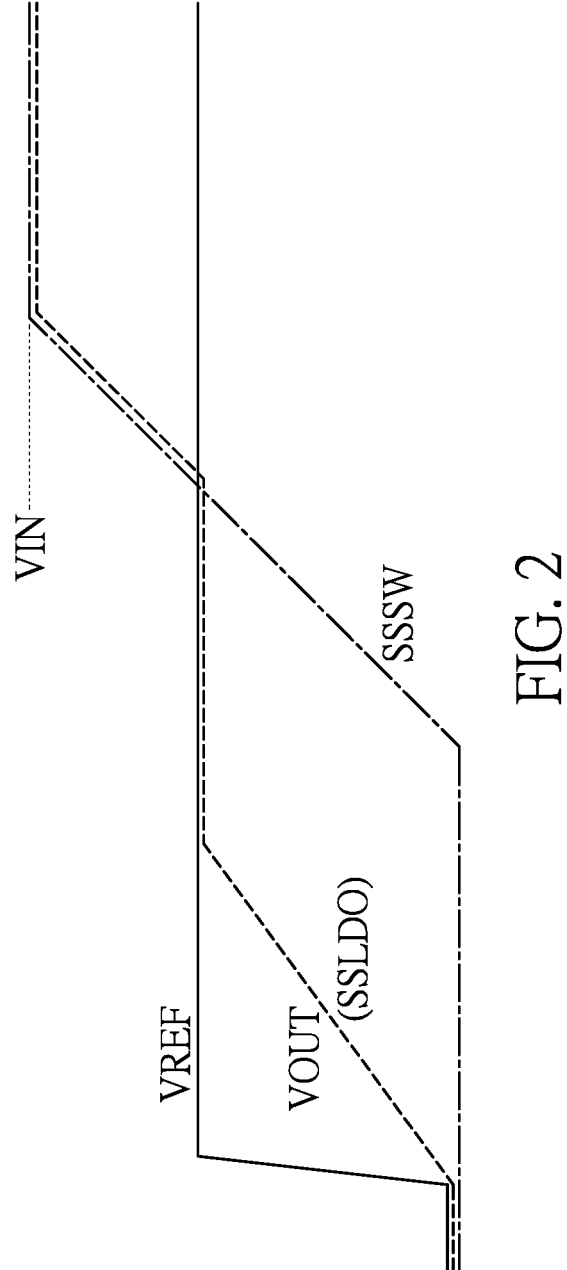
FIG. 2 is a waveform diagram of signals of the low-dropout regulator having the output voltage switching circuit according to the first embodiment to a fifth embodiment of the present disclosure.

Reference is made to FIG. 1 and FIG. 2, in which FIG. 1 is a circuit diagram of a low-dropout regulator having an output voltage switching circuit according to a first embodiment of the present disclosure, and FIG. 2 is a waveform diagram of signals of the low-dropout regulator having the output voltage switching circuit according to the first embodiment to a fifth embodiment of the present disclosure.

In the first embodiment, the low-dropout regulator of the present disclosure includes a transistor T11, a low-dropout linear regulator circuit LDO, a switch error amplifier circuit SWT, a switch component SW11 and a voltage selector circuit SEL. If necessary, the low-dropout regulator of the present disclosure may further include an output capacitor Cout.

A first terminal of the transistor T11 is coupled with an input voltage VIN. A second terminal of the transistor T11 is grounded and may be connected to a first terminal of the output capacitor Cout. A second terminal of the output capacitor Cout is grounded. The second terminal of the transistor T11 or the first terminal of the output capacitor Cout is used as an output terminal of the low-dropout regulator of the present disclosure. A voltage of the output terminal of the low-dropout regulator of the present disclosure is an output voltage VOUT as shown in FIG. 1.

The second terminal of the transistor T11 or the first terminal of the output capacitor Cout (that is the output terminal of the low-dropout regulator of the present disclosure) is used to provide the output voltage VOUT to a load connected thereto. Therefore, the low-dropout linear regulator circuit LDO and the switch error amplifier circuit SWT are connected to the second terminal of the transistor T11 or the first terminal of the output capacitor Cout (that is the output terminal of the low-dropout regulator of the present disclosure), and receive the output voltage VOUT of the low-dropout regulator.

In the first embodiment, the output voltage VOUT of the low-dropout regulator is used as a feedback voltage VFB that is fed back to the low-dropout linear regulator circuit LDO and the switch error amplifier circuit SWT, but the present disclosure is not limited thereto.

In practice, the low-dropout regulator of the present disclosure may further include a voltage divider circuit. The voltage divider circuit may be connected between the second terminal of the transistor T11 or the first terminal of the output capacitor Cout and the low-dropout linear regulator circuit LDO. In addition, the voltage divider circuit may be connected between the second terminal of the transistor T11 or the first terminal of the output capacitor Cout and the switch error amplifier circuit SWT. The voltage divider circuit may divide the output voltage VOUT of the low-dropout regulator of the present disclosure to generate a divided voltage as the feedback voltage VFB, but the present disclosure is not limited thereto. The feedback voltage VFB is fed back to the low-dropout linear regulator circuit LDO and the switch error amplifier circuit SWT.

The low-dropout linear regulator circuit LDO may output a regulating signal according to a voltage difference between the feedback voltage VFB (that is the output voltage VOUT of the low-dropout regulator or the divided voltage thereof) and a voltage of a regulation threshold voltage signal SSLDO (from an external regulation instructing circuit). Alternatively, low-dropout linear regulator circuit LDO may output the regulating signal according to a voltage difference between the feedback voltage VFB and a reference voltage VREF.

The switch error amplifier circuit SWT outputs a pull-up control signal according to a voltage difference between the feedback voltage VFB (that is the output voltage VOUT of the low-dropout regulator or the divided voltage thereof) and a voltage of a voltage pull-up switching signal SSSW (from an external pull-up enable circuit).

The voltage selector circuit SEL is connected to the low-dropout linear regulator circuit LDO, the switch error amplifier circuit SWT and a control terminal of the transistor T11. The voltage selector circuit SEL selects one of the regulating signal from the low-dropout linear regulator circuit LDO and the pull-up control signal from the switch error amplifier circuit SWT.

For example, the voltage selector circuit SEL may compare a voltage of the regulating signal from the low-dropout linear regulator circuit LDO with a voltage of the pull-up control signal from the switch error amplifier circuit SWT to select one of the regulating signal and the pull-up control signal. For example, the voltage selector circuit SEL determines which one of the regulating signal and the pull-up control signal has a lower voltage and selects the one of the regulating signal and the pull-up control signal.

The switch component SW11 may be a transistor, a switching component or other component having the same function. A first terminal of the switch component SW11 is coupled with the input voltage VIN. A second terminal of the switch component SW11 is connected to the second terminal of the transistor T11 or the first terminal of the output capacitor Cout (that is the output terminal of the low-dropout regulator of the present disclosure). A control terminal of the switch component SW11 is connected to the switch error amplifier circuit SWT. The switch component SW11 operates according to the pull-up control signal from the switch error amplifier circuit SWT.

When the voltage selector circuit SEL selects the regulating signal from among the regulating signal from the low-dropout linear regulator circuit LDO and the pull-up control signal from the switch error amplifier circuit SWT, the voltage selector circuit SEL transmits the regulating signal to the control terminal of the transistor T11. The transistor T11 operates to regulate the output voltage VOUT of the low-dropout regulator of the present disclosure according to the regulating signal from the voltage selector circuit SEL.

When the voltage selector circuit SEL selects the pull-up control signal from among the regulating signal from the low-dropout linear regulator circuit LDO and the pull-up control signal from the switch error amplifier circuit SWT, the voltage selector circuit SEL does not transmit the regulating signal to the control terminal of the transistor T11. At the same time, the switch component SW11 is turned on by the pull-up control signal from the switch error amplifier circuit SWT. As a result, the output voltage VOUT of the low-dropout regulator of the present disclosure is pulled up (to be equal to or approximately equal to the input voltage VIN as shown in FIG. 2) by the input voltage VIN to which the first terminal of the switch component SW11 is coupled.

For example, when the transistor T11 operates according to the regulating signal from the low-dropout linear regulator circuit LDO such that the output terminal of the low-dropout regulator of the present disclosure supplies enough power to the load connected thereto, the transistor T11 may be continually controlled by the low-dropout linear regulator circuit LDO to regulate the output voltage VOUT of the low-dropout regulator of the present disclosure.

However, after the input voltage VIN (such as, but not limited to, a voltage of a battery) is used for a long period of time, the input voltage VIN to which the first terminal of the transistor T11 is coupled may be reduced to be lower than a voltage required for the load connected to the output terminal of the low-dropout regulator of the present disclosure.

When the output terminal of the low-dropout regulator in which the transistor T11 operates according to the regulating signal from the low-dropout linear regulator circuit LDO supplies insufficient power to the load, the switch component SW11 is turned on by the switch error amplifier circuit SWT. As a result, the output voltage VOUT of the low-dropout regulator of the present disclosure is directly pulled up (to be equal to or approximately equal to the input voltage VIN as shown in FIG. 2) by the input voltage VIN to which the first terminal of the switch component SW11 is coupled.

Therefore, even if the input voltage VIN (such as, but not limited to, the voltage of the battery) to which the first terminal of the transistor T1 is coupled is an excessively low voltage (after the input voltage VIN is used for a long period of time), the output terminal of the low-dropout regulator of the present disclosure supplies enough power to the load connected thereto.

That is, the low-dropout regulator of the present disclosure is quickly switched between a low dropout linear regulation mode and a load switch mode. In the low dropout linear regulation, the low-dropout linear regulator circuit LDO controls the transistor T11 to regulate the output voltage VOUT of the low-dropout regulator of the present disclosure. In the load switch mode, the switch error amplifier circuit SWT turns on the switch component SW11 for pulling up the output voltage VOUT of the low-dropout regulator of the present disclosure. Therefore, the output voltage VOUT of the low-dropout regulator of the present disclosure quickly reaches a target voltage as shown in FIG. 2 for efficiently supplying enough power to the load.

Figure 3:
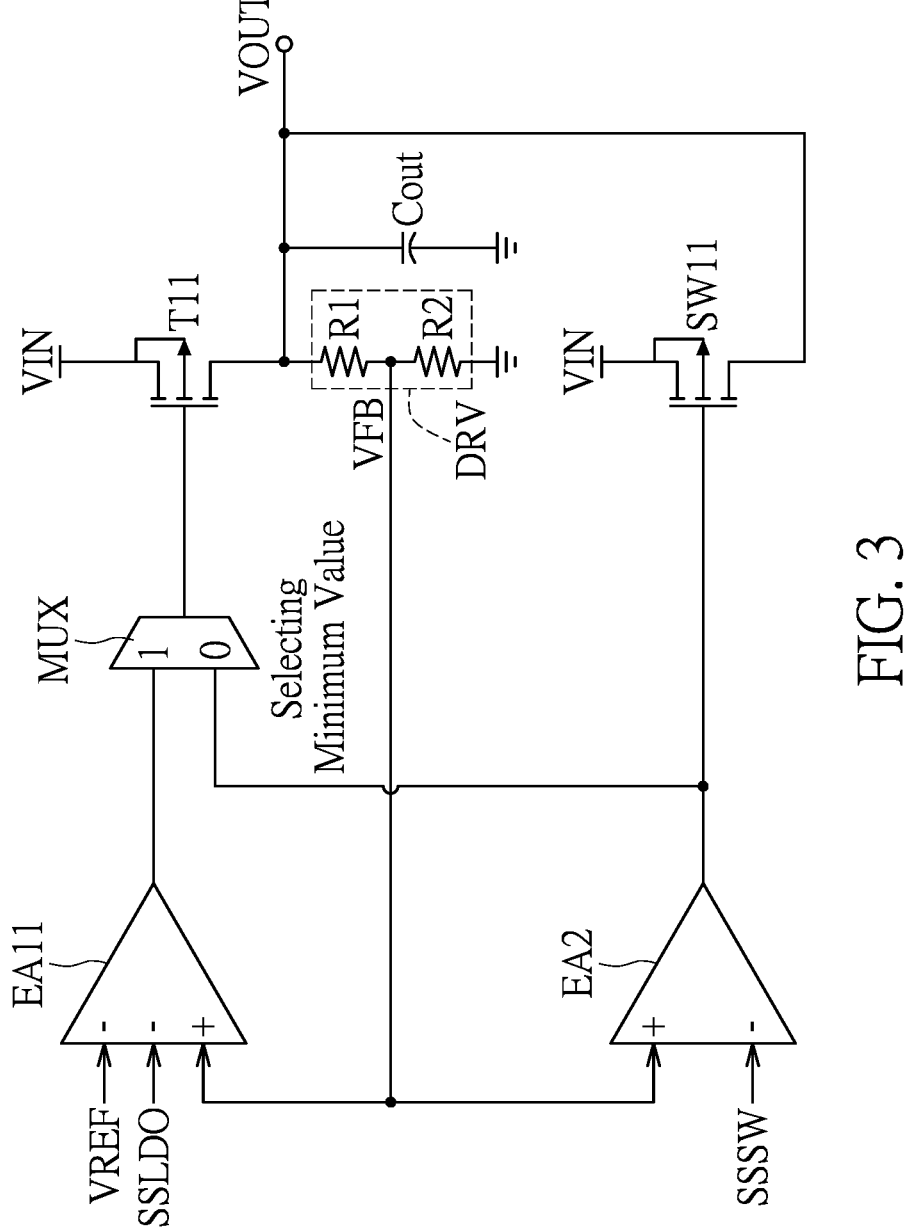
FIG. 3 is a circuit diagram of the low-dropout regulator having the output voltage switching circuit according to the second embodiment of the present disclosure.

Reference is made to FIG. 3, which is a circuit diagram of the low-dropout regulator having the output voltage switching circuit according to the second embodiment of the present disclosure.

In the second embodiment, the low-dropout regulator of the present disclosure includes a low-dropout linear regulator circuit, a switch error amplifier circuit, a voltage selector circuit and a voltage divider circuit DRV. The low-dropout linear regulator circuit includes a first error amplifier EA11. The switch error amplifier circuit includes a second error amplifier EA2. The voltage selector circuit includes a multiplexer MUX. The voltage divider circuit DRV includes a first resistor R1 and a second resistor R2.

The first terminal of the transistor T11 is coupled with the input voltage VIN. The second terminal of the transistor T11 is connected to a first terminal of the first resistor R1 (that is an input terminal of the voltage divider circuit DRV) and the first terminal of the output capacitor Cout. A second terminal of the first resistor R1 is connected to a first terminal of the second resistor R2. A second terminal of the second resistor R2 and the second terminal of the output capacitor Cout are grounded.

A first input terminal such as an inverting input terminal of the first error amplifier EA11 is coupled with the reference voltage VREF. A second input terminal such as a non-inverting input terminal of the first error amplifier EA11 is connected to the external regulation instructing circuit, and configured to receive the regulation threshold voltage signal SSLDO from the external regulation instructing circuit.

In the second embodiment, a node between the second terminal of the first resistor R1 and the first terminal of the second resistor R2 is connected to a third input terminal such as a non-inverting input terminal of the first error amplifier EA11 and a first input terminal such as a non-inverting input terminal of the second error amplifier EA2.

The second terminal of the transistor T11 or the first terminal of the output capacitor Cout (that is the output terminal of the low-dropout regulator of the present disclosure) is used to supply the output voltage VOUT to the load connected thereto.

In the second embodiment, a voltage of the node between the second terminal of the first resistor R1 and the first terminal of the second resistor R2 (that is an output terminal of the voltage divider circuit DRV) is used as the feedback voltage VFB. The feedback voltage VFB is a divided voltage of the output voltage VOUT of the low-dropout regulator of the present disclosure, and is fed back to the third input terminal such as the non-inverting input terminal of the first error amplifier EA11 and the first input terminal such as the non-inverting input terminal of the second error amplifier EA2.

A second input terminal such as an inverting input terminal of the second error amplifier EA2 is connected to the external pull-up enable circuit, and configured to receive the voltage pull-up switching signal SSSW from the external pull-up enable circuit. An output terminal of the second error amplifier EA2 is connected to the control terminal of the switch component SW11.

The first error amplifier EA11 multiplies the voltage difference between the feedback voltage VFB (that is the divided voltage of the output voltage VOUT of the low-dropout regulator of the present disclosure) and the voltage of the regulation threshold voltage signal SSLDO or the reference voltage VREF by a gain to output the regulating signal.

The second error amplifier EA2 multiplies the voltage difference between the feedback voltage VFB (that is the output voltage VOUT of the low-dropout regulator or the divided voltage thereof) and the voltage of the voltage pull-up switching signal SSSW by a gain to output the pull-up control signal.

A first input terminal 1 of the multiplexer MUX is connected to the output terminal of the first error amplifier EA11 of the low-dropout linear regulator circuit and receives the regulating signal from the output terminal of the first error amplifier EA11. A second input terminal 0 of the multiplexer MUX is connected to the output terminal of the second error amplifier EA2 of the switch error amplifier circuit and receives the pull-up control signal from the output terminal of the second error amplifier EA2. An output terminal of the multiplexer MUX is connected to the control terminal of the transistor T11.

The multiplexer MUX selects one of the regulating signal from the first error amplifier EA11 and the pull-up control signal from the second error amplifier EA2 of the switch error amplifier circuit. For example, in the second embodiment, the multiplexer MUX determines which one of the regulating signal and the pull-up control signal has a lower voltage and selects the one of the regulating signal and the pull-up control signal, but the present disclosure is not limited thereto.

The first terminal of the switch component SW11 is coupled with the input voltage VIN. The second terminal of the switch component SW11 is connected to the second terminal of the transistor T11 or the first terminal of the output capacitor Cout (that is the output terminal of the low-dropout regulator of the present disclosure). The control terminal of the switch component SW11 is connected to the output terminal of the second error amplifier EA2 of the switch error amplifier circuit. The switch component SW11 operates according to the pull-up control signal from the output terminal of the second error amplifier EA2.

For example, when the multiplexer MUX selects the regulating signal from among the regulating signal and the pull-up control signal, the multiplexer MUX transmits the regulating signal to the control terminal of the transistor T11. The transistor T11 operates according to the regulating signal from the multiplexer MUX for regulating the output voltage VOUT of the low-dropout regulator of the present disclosure.

Conversely, when the multiplexer MUX selects the pull-up control signal from among the regulating signal and the pull-up control signal, the multiplexer MUX does not transmit the regulating signal to the control terminal of the transistor T11. At the same time, the control terminal of the switch component SW11 is turned on by the pull-up control signal from the output terminal of the second error amplifier EA2. As a result, a voltage of the second terminal of the transistor T11 or a voltage of the first terminal of the output capacitor Cout (that is the output voltage VOUT of the low-dropout regulator of the present disclosure) is pulled up (to be equal to or approximately equal to the input voltage VIN) by the input voltage VIN to which the first terminal of the switch component SW11 is coupled.

In practice, the voltage divider circuit DRV may be omitted. Under this condition, the second terminal of the transistor T11 or the first terminal of the output capacitor Cout (that is the output terminal of the low-dropout regulator of the present disclosure) is used as a feedback node. The second terminal of the transistor T11 or the first terminal of the output capacitor Cout is directly connected to the third input terminal such as the non-inverting input terminal of the first error amplifier EA11 and the first input terminal such as the non-inverting input terminal of the second error amplifier EA2. The output voltage VOUT of the low-dropout regulator of the present disclosure is used as the feedback voltage VFB. The feedback voltage VFB is directly fed to the third input terminal such as the non-inverting input terminal of the first error amplifier EA11 and the first input terminal such as the non-inverting input terminal of the second error amplifier EA2.

Figure 4:
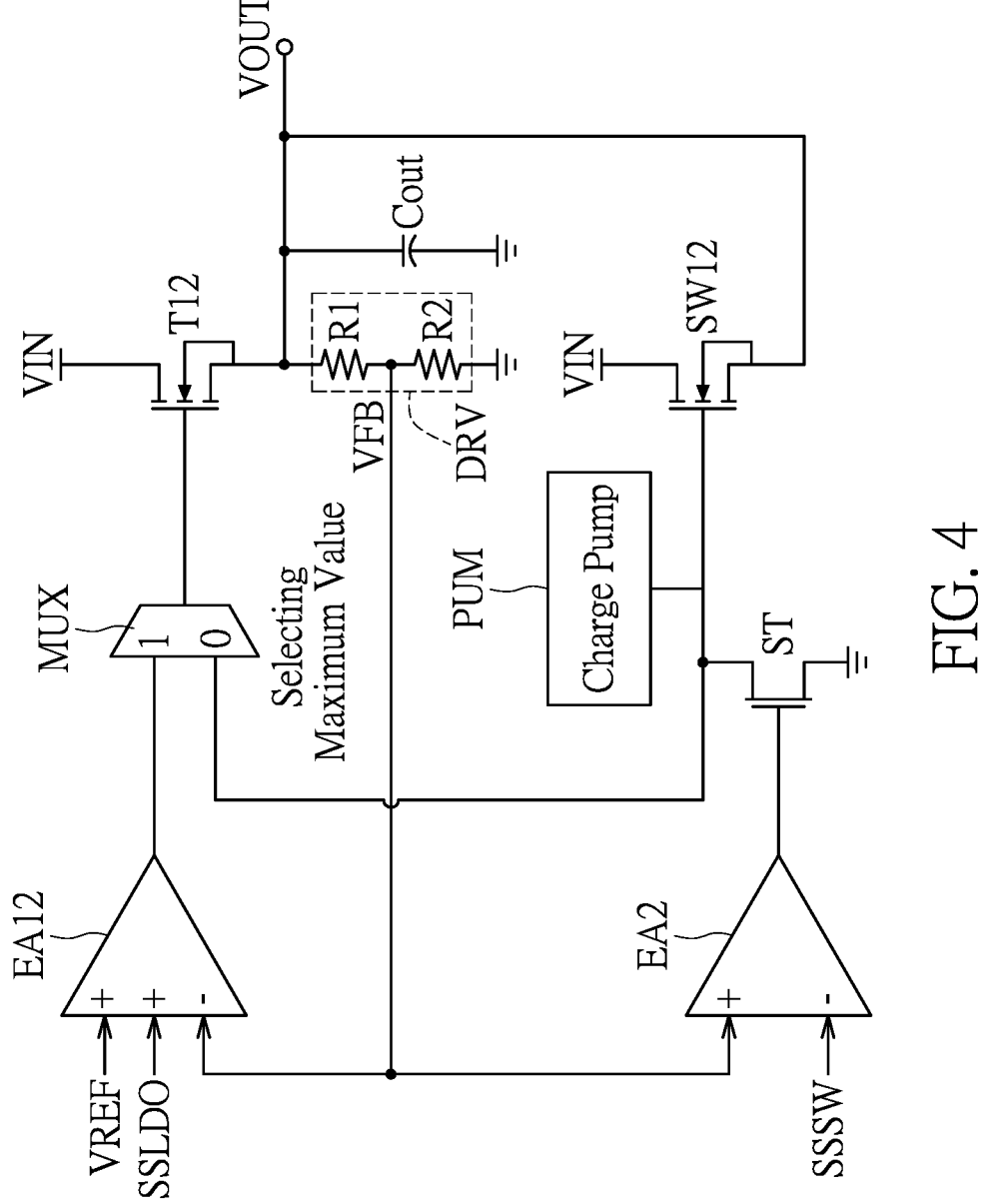
FIG. 4 is a circuit diagram of the low-dropout regulator having the output voltage switching circuit according to the third embodiment of the present disclosure.

Reference is made to FIG. 4, which is a circuit diagram of the low-dropout regulator having the output voltage switching circuit according to the third embodiment of the present disclosure. The descriptions of the third embodiment that are the same as the descriptions of the second embodiment are not repeated herein.

As shown in FIG. 3, in the second embodiment, the low-dropout regulator of the present disclosure includes the transistor T11 and the switch component SW11 that are p-type metal-oxide-semiconductor field-effect transistors (PMOSFETs).

As shown in FIG. 4, in the third embodiment, the low-dropout regulator of the present disclosure includes the transistor T12 and the switch component SW12 that are n-type metal-oxide-semiconductor field-effect transistors (NMOSFETs).

Therefore, as shown in FIG. 4, in the third embodiment, the low-dropout regulator of the present disclosure further includes a switching component ST and a charge pump PUM that are used for the switch component SW12 that is the n-type metal-oxide-semiconductor field-effect transistor (NMOSFET).

It should be understood that, the types of the transistor and the switch component of the low-dropout regulator of the present disclosure are exemplified herein, but the present disclosure is not limited thereto.

The output terminal of the second error amplifier EA2 is connected to a control terminal of the switching component ST. A first terminal of the switching component ST is connected to the second input terminal 0 of the multiplexer MUX and a control terminal of the switch component SW12. A second terminal of the switching component ST is grounded.

A first input terminal such as a non-inverting input terminal of the first error amplifier EA12 is coupled with the reference voltage VREF. A second input terminal such as a non-inverting input terminal of the first error amplifier EA12 is connected to the external regulation instructing circuit, and receives the regulation threshold voltage signal SSLDO from the external regulation instructing circuit. A third input terminal such as an inverting input terminal of the first error amplifier EA12 is connected to the node between the second terminal of the first resistor R1 and the first terminal of the second resistor R2.

The first input terminal 1 of the multiplexer MUX is connected to an output terminal of the first error amplifier EA12 and receives the regulating signal from the output terminal of the first error amplifier EA12. The second input terminal 0 of the multiplexer MUX receives a signal from the first terminal of the switching component ST.

The multiplexer MUX selects one of the regulating signal from the first error amplifier EA12 and the signal from the first terminal of the switching component ST. For example, in the third embodiment, the multiplexer MUX determines which one of the regulating signal from the first error amplifier EA12 and the signal from the first terminal of the switching component ST has a higher voltage and selects the one of the regulating signal and the pull-up control signal, but the present disclosure is not limited thereto.

The charge pump PUM is connected to the control terminal of the switch component SW12 and the first terminal of the switching component ST. The charge pump may continually supply power. When the switching component ST is turned on by the pull-up control signal outputted from the output terminal of the second error amplifier EA2, the control terminal of the switch component SW12 and a control terminal of the charge pump PUM are grounded through the switching component ST being turned on. As a result, the power supplied by the charge pump PUM flows to a ground and a voltage of the control terminal of the switch component SW12 is pulled down to a zero value such that the switch component SW12 is turned off.

Figure 5:
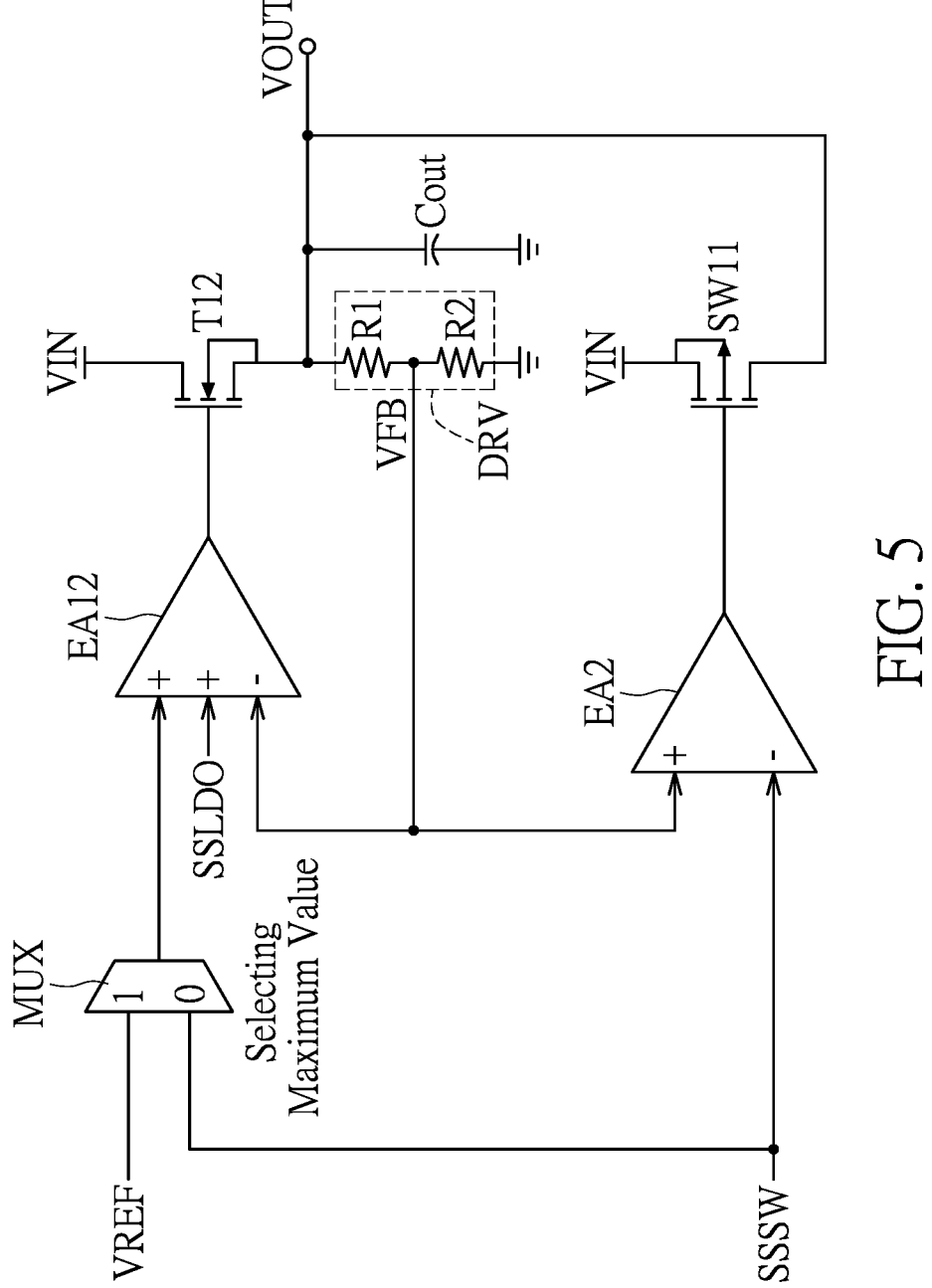
FIG. 5 is a circuit diagram of the low-dropout regulator having the output voltage switching circuit according to the fourth embodiment of the present disclosure.

Reference is made to FIG. 5, which is a circuit diagram of the low-dropout regulator having the output voltage switching circuit according to the fourth embodiment of the present disclosure.

In the fourth embodiment, the low-dropout regulator of the present disclosure includes a transistor T12, the low-dropout linear regulator circuit (including the first error amplifier EA12), the switch error amplifier circuit (including the second error amplifier EA2), the switch component SW11 and the voltage selector circuit (including the multiplexer MUX). If necessary, the low-dropout regulator of the present disclosure may further include the output capacitor Cout and the voltage divider circuit DRV as shown in FIG. 5.

The first input terminal 1 of the multiplexer MUX is coupled with the reference voltage VREF. The second input terminal 0 of the multiplexer MUX is connected to the external pull-up enable circuit and receives the voltage pull-up switching signal SSSW from the external pull-up enable circuit.

The first input terminal such as the non-inverting input terminal of the first error amplifier EA12 of the low-dropout linear regulator circuit is connected to the output terminal of the multiplexer MUX of the voltage selector circuit. The multiplexer MUX selects one of the reference voltage VREF and the voltage pull-up switching signal SSSW. For example, in the fourth embodiment, the multiplexer MUX determines which one of the reference voltage VREF and the voltage pull-up switching signal SSSW has a higher voltage, and selects the one of the reference voltage VREF and the voltage pull-up switching signal SSSW to output a voltage selected signal, but the present disclosure is not limited thereto. The voltage selected signal is inputted to the first input terminal such as the non-inverting input terminal of the first error amplifier EA12.

The second input terminal such as the non-inverting input terminal of the first error amplifier EA12 of the low-dropout linear regulator circuit is connected to the external regulation instructing circuit, and receives the regulation threshold voltage signal SSLDO from the external regulation instructing circuit.

The third input terminal such as the inverting input terminal of the first error amplifier EA12 is connected to the node (that is the output terminal of the voltage divider circuit DRV) between the second terminal of the first resistor R1 and the first terminal of the second resistor R2.

The output terminal of the first error amplifier EA12 is connected to a control terminal of the transistor T12. A first terminal of the transistor T12 is coupled with the input voltage VIN. A second terminal of the transistor T12 is connected to the first terminal of the first resistor R1.

The first input terminal such as the non-inverting input terminal of the second error amplifier EA2 is connected to the node (that is the output terminal of the voltage divider circuit DRV) between the second terminal of the first resistor R1 and the first terminal of the second resistor R2. The second input terminal such as the inverting input terminal of the second error amplifier EA2 is connected to the external pull-up enable circuit, and configured to receive the voltage pull-up switching signal SSSW from the external pull-up enable circuit.

The output terminal of the second error amplifier EA2 is connected to the control terminal of the switch component SW11. The first terminal of the switch component SW11 is coupled with the input voltage VIN. The second terminal of the switch component SW11 is connected to the second terminal of the transistor T12 or the first terminal of the output capacitor Cout (that is the output terminal of the low-dropout regulator of the present disclosure).

Figure 6:
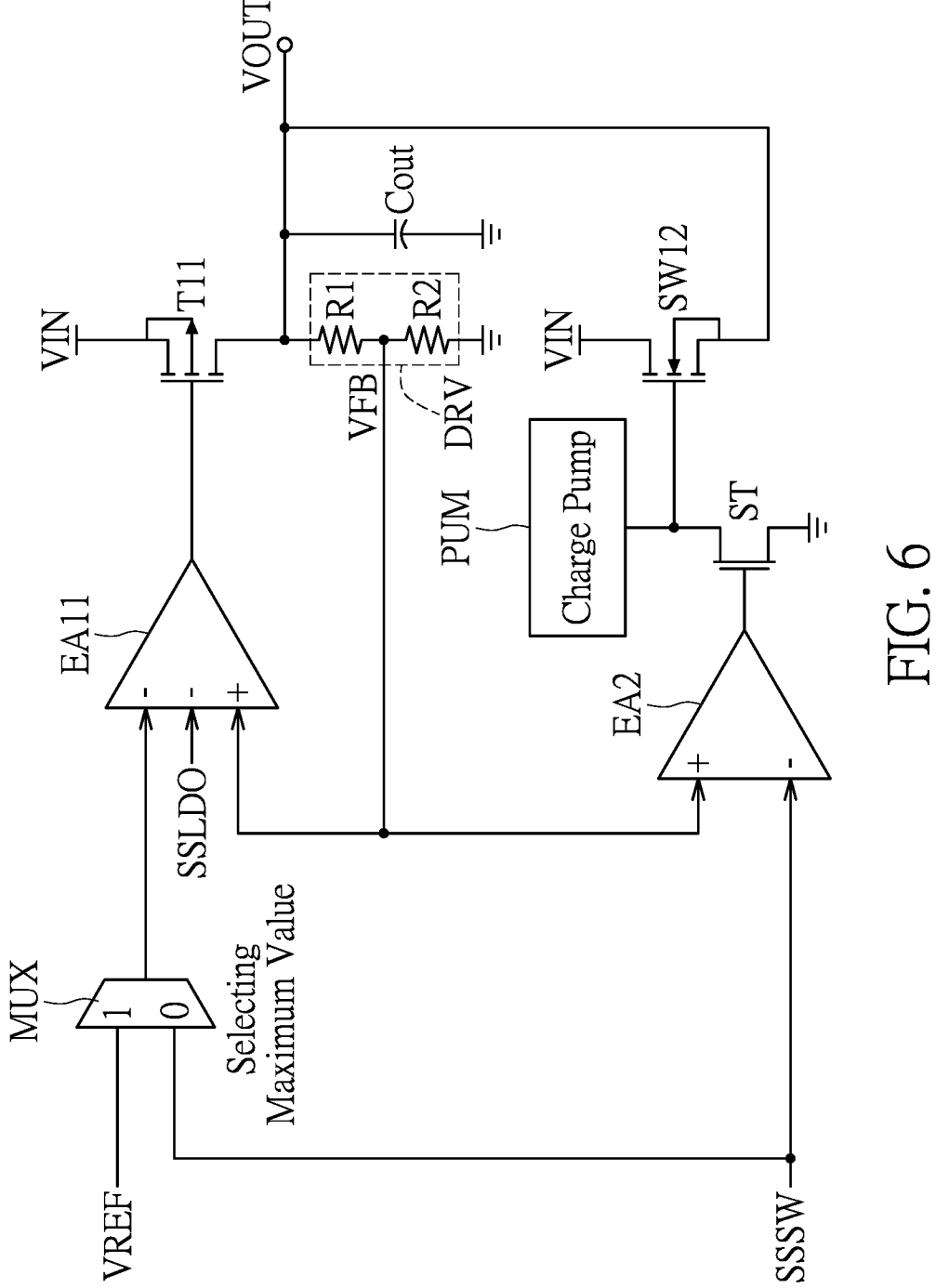
FIG. 6 is a circuit diagram of the low-dropout regulator having the output voltage switching circuit according to the fifth embodiment of the present disclosure.

Reference is made to FIG. 6, which is a circuit diagram of the low-dropout regulator having the output voltage switching circuit according to the fifth embodiment of the present disclosure. The descriptions of the fifth embodiment that are the same as the descriptions of the first to fourth embodiments are not repeated herein.

Differences between the fifth embodiment and the fourth embodiment are described in detail as follows.

As shown in FIG. 5, in the fourth embodiment, the low-dropout regulator of the present disclosure includes the switch component SW11 that is the p-type metal-oxide-semiconductor field-effect transistor (PMOSFET).

As shown in FIG. 6, in the fifth embodiment, the low-dropout regulator of the present disclosure includes the switch component SW12 that is the n-type metal-oxide-semiconductor field-effect transistor (NMOSFET).

Therefore, in the fifth embodiment, the low-dropout regulator of the present disclosure further includes the switching component ST and the charge pump PUM that are used for the switch component SW12 that is the n-type metal-oxide-semiconductor field-effect transistor (NMOSFET). The configurations and the operations of the switching component ST and the charge pump PUM of the fifth embodiment are same as that of the fourth embodiment, and thus are not particularly described in the fifth embodiment.

On the other hand, as shown in FIG. 5, in the fifth embodiment, the transistor T12 of the low-dropout regulator of the present disclosure is the n-type metal-oxide-semiconductor field-effect transistor (NMOSFET). As shown in FIG. 6, in the fifth embodiment, the transistor T11 of the low-dropout regulator of the present disclosure is the p-type metal-oxide-semiconductor field-effect transistor (PMOSFET). Therefore, the configurations of the inverting input terminals and the non-inverting input terminal of the first error amplifier EA11, as shown in FIG. 6, are different from the configurations of the inverting input terminal and the non-inverting input terminals of the first error amplifier EA12 as shown in FIG. 5.

In conclusion, the present disclosure provides the low-dropout regulator having the output voltage switching circuit. In the low-dropout regulator of the present disclosure, the low-dropout linear regulator circuit is configured to control the transistor, and the switch error amplifier circuit is configured to turn on or off the switch component. The low-dropout linear regulator circuit and the switch error amplifier circuit of the low-dropout regulator of the present disclosure are alternately used, and may be quickly switched for responding to adjustments in practical application, for example, quickly pulling up the output voltage of the low-dropout regulator of the present disclosure to a target voltage required for the load. Therefore, the low-dropout regulator of the present disclosure is capable of quickly supplying enough power required for the load.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A low-dropout regulator having an output voltage switching circuit, comprising:

a transistor, wherein a first terminal of the transistor is coupled with an input voltage, a second terminal of the transistor is grounded, and the second terminal of the transistor is used as an output terminal of the low-dropout regulator;

a low-dropout linear regulator circuit connected to the output terminal of the low-dropout regulator, wherein the low-dropout linear regulator circuit is configured to output a regulating signal according to a voltage difference between an output voltage of the low-dropout regulator and a voltage of a regulation threshold voltage signal or a reference voltage;

a switch error amplifier circuit connected to the output terminal of the low-dropout regulator, and configured to output a pull-up control signal according to a voltage difference between the output voltage of the low-dropout regulator and a voltage of a voltage pull-up switching signal;

a switch component, wherein a first terminal of the switch component is coupled with the input voltage, a second terminal of the switch component is connected to the output terminal of the low-dropout regulator, a control terminal of the switch component is connected to the switch error amplifier circuit, and the switch component is configured to operate according to the pull-up control signal from the switch error amplifier circuit; and a voltage selector circuit connected to the low-dropout linear regulator circuit, the switch error amplifier circuit and a control terminal of the transistor, and configured to select one of the regulating signal and the pull-up control signal;

wherein, when the voltage selector circuit selects the regulating signal from among the regulating signal and the pull-up control signal, the voltage selector circuit transmits the regulating signal to the control terminal of the transistor, and the transistor operates to regulate the output voltage of the low-dropout regulator according to the regulating signal from the voltage selector circuit;

wherein, when the voltage selector circuit selects the pull-up control signal from among the regulating signal and the pull-up control signal, the switch component is turned on by the pull-up control signal from the switch error amplifier circuit such that the output voltage of the low-dropout regulator is directly pulled up by the input voltage through the switch component.

2. The low-dropout regulator according to claim 1, further comprising:

an output capacitor, wherein a first terminal of the output capacitor is connected to the second terminal of the transistor, a second terminal of the output capacitor is grounded, and a voltage of the first terminal of the output capacitor is used as the output voltage of the low-dropout regulator.

3. The low-dropout regulator according to claim 1, wherein the voltage selector circuit compares a voltage of the regulating signal from the low-dropout linear regulator circuit with a voltage of the pull-up control signal from the switch error amplifier circuit to select one of the regulating signal and the pull-up control signal.

4. The low-dropout regulator according to claim 1, wherein the low-dropout linear regulator circuit includes:

a first error amplifier, wherein a first input terminal of the first error amplifier is coupled with the reference voltage, a second input terminal of the first error amplifier is connected to an external regulation instructing circuit and configured to receive the regulation threshold voltage signal from the regulation instructing circuit, a third input terminal of the first error amplifier is connected to the output terminal of the low-dropout regulator, and an output terminal of the first error amplifier is connected to an input terminal of the voltage selector circuit.

5. The low-dropout regulator according to claim 4, wherein the switch error amplifier circuit includes:

a second error amplifier, wherein a first input terminal of the second error amplifier is connected to the output terminal of the low-dropout regulator, a second input terminal of the second error amplifier is connected to an external pull-up enable circuit and configured to receive the voltage pull-up switching signal from the external pull-up enable circuit, and an output terminal of the second error amplifier is connected to the control terminal of the switch component.

6. The low-dropout regulator according to claim 5, wherein the voltage selector circuit includes:

a multiplexer, wherein a first input terminal of the multiplexer is connected to the output terminal of the first error amplifier, a second input terminal of the multiplexer is connected to the output terminal of the second error amplifier, and an output terminal of the multiplexer is connected to the control terminal of the transistor.

7. The low-dropout regulator according to claim 6, further comprising:

a switching component, wherein a control terminal of the switching component is connected to the output terminal of the second error amplifier, a first terminal of the switching component is connected to the input terminal of the voltage selector circuit and the control terminal of the switch component, and a second terminal of the switching component is grounded.

8. The low-dropout regulator according to claim 7, further comprising:

a charge pump connected to the control terminal of the switch component and the first terminal of the switching component, and configured to supply power to the control terminal of the switch component.

9. The low-dropout regulator according to claim 5, further comprising:

a voltage divider circuit, wherein an input terminal of the voltage divider circuit is connected between the second terminal of the transistor and a ground, and an output terminal of the voltage divider circuit is connected to the third input terminal of the first error amplifier and the first input terminal of the second error amplifier.

10. The low-dropout regulator according to claim 9, wherein the voltage divider circuit includes:

a first resistor, wherein a first terminal of the first resistor is connected to the second terminal of the transistor; and a second resistor, wherein a first terminal of the second resistor is connected to a second terminal of the first resistor, and a second terminal of the second resistor is grounded;

wherein the third input terminal of the first error amplifier and the first input terminal of the second error amplifier are connected to a node between the first terminal of the second resistor and the second terminal of the second resistor.

11. A low-dropout regulator having an output voltage switching circuit, comprising:

a voltage selector circuit, wherein the voltage selector circuit is coupled with a reference voltage and connected to an external pull-up enable circuit, the voltage selector circuit is configured to receive a voltage pull-up switching signal from the external pull-up enable circuit, and the voltage selector circuit is configured to select one of the reference voltage and the voltage pull-up switching signal to output a voltage selected signal;

a transistor, wherein a first terminal of the transistor is coupled with an input voltage, a second terminal of the transistor is grounded, and the second terminal of the transistor is used as an output terminal of the low-dropout regulator;

a low-dropout linear regulator circuit connected to the output terminal of the low-dropout regulator, a control terminal of the transistor and an output terminal of the voltage selector circuit, wherein the low-dropout linear regulator circuit is configured to output a regulating signal to the control terminal of the transistor according to a voltage difference between an output voltage of the low-dropout regulator and a voltage of the voltage selected signal or a voltage of a regulation threshold voltage signal;

a switch error amplifier circuit connected to the output terminal of the low-dropout regulator and the external pull-up enable circuit, and configured to output a pull-up control signal according to a voltage difference between the output voltage of the low-dropout regulator and a voltage of the voltage pull-up switching signal from the external pull-up enable circuit; and a switch component, wherein a first terminal of the switch component is coupled with the input voltage, a second terminal of the switch component is connected to the output terminal of the low-dropout regulator, a control terminal of the switch component is connected to the switch error amplifier circuit, and the switch component is configured to operate according to the pull-up control signal from the switch error amplifier circuit.

12. The low-dropout regulator according to claim 11, further comprising:

an output capacitor, wherein a first terminal of the output capacitor is connected to the second terminal of the transistor, a second terminal of the output capacitor is grounded, and a voltage of the first terminal of the output capacitor is used as the output voltage of the low-dropout regulator.

13. The low-dropout regulator according to claim 11, wherein the low-dropout linear regulator circuit includes:

a first error amplifier, wherein a first input terminal of the first error amplifier is connected to the output terminal of the voltage selector circuit, a second input terminal of the first error amplifier is connected to an external regulation instructing circuit and configured to receive the regulation threshold voltage signal from the regulation instructing circuit, a third input terminal of the first error amplifier is connected to the output terminal of the low-dropout regulator, and an output terminal of the first error amplifier is connected to the control terminal of the transistor.

14. The low-dropout regulator according to claim 13, wherein the switch error amplifier circuit includes:

a second error amplifier, wherein a first input terminal of the second error amplifier is connected to the output terminal of the low-dropout regulator, a second input terminal of the second error amplifier is connected to the external pull-up enable circuit and configured to receive the voltage pull-up switching signal from the external pull-up enable circuit, and an output terminal of the second error amplifier is connected to the control terminal of the switch component.

15. The low-dropout regulator according to claim 14, wherein the voltage selector circuit includes:

a multiplexer, wherein a first input terminal of the multiplexer is coupled with the reference voltage, a second input terminal of the multiplexer is connected to the external pull-up enable circuit and configured to receive the voltage pull-up switching signal from the external pull-up enable circuit, and an output terminal of the multiplexer is connected to the first input terminal of the first error amplifier.

16. The low-dropout regulator according to claim 14, further comprising:

a voltage divider circuit, wherein an input terminal of the voltage divider circuit is connected between the second terminal of the transistor and a ground, and an output terminal of the voltage divider circuit is connected to the third input terminal of the first error amplifier and the first input terminal of the second error amplifier.

17. The low-dropout regulator according to claim 16, wherein the voltage divider circuit includes:

a first resistor, wherein a first terminal of the first resistor is connected to the second terminal of the transistor; and a second resistor, wherein a first terminal of the second resistor is connected to a second terminal of the first resistor, and a second terminal of the second resistor is grounded;

wherein the third input terminal of the first error amplifier and the first input terminal of the second error amplifier are connected to a node between the first terminal of the second resistor and the second terminal of the second resistor.

18. The low-dropout regulator according to claim 14, further comprising:

a switching component, wherein a control terminal of the switching component is connected to the output terminal of the second error amplifier, a first terminal of the switching component is connected to the control terminal of the switch component, and a second terminal of the switching component is grounded.

19. The low-dropout regulator according to claim 18, further comprising:

a charge pump connected to the control terminal of the switch component and the first terminal of the switching component, and configured to supply power to the control terminal of the switch component.

* * * * *